(12) United States Patent
Iinan et al.

(10) Patent No.: US 9,781,900 B2
(45) Date of Patent: Oct. 10, 2017

(54) PET TRANSPORT

(71) Applicant: FORD GLOBAL TECHNOLOGIES, LLC, Dearborn, MI (US)

(72) Inventors: Eric Vargas Iinan, Metepec (MX); Edgardo F. Ortiz Hernandez, Toluca (MX); Jose Ernesto Simon Gonzalez, Culiacan (MX)

(73) Assignee: Ford Global Technologies, LLC, Dearborn, MI (US)

( * ) Notice: Subject to any disclaimer, the term of this patent is extended or adjusted under 35 U.S.C. 154(b) by 140 days.

(21) Appl. No.: 14/730,489

(22) Filed: Jun. 4, 2015

(65) Prior Publication Data
US 2016/0353707 A1  Dec. 8, 2016

(51) Int. Cl.
| | |
|---|---|
| B60R 7/00 | (2006.01) |
| A01K 1/02 | (2006.01) |
| A01K 1/00 | (2006.01) |
| A01K 1/035 | (2006.01) |
| B60R 7/02 | (2006.01) |
| B60R 7/04 | (2006.01) |
| B60N 2/36 | (2006.01) |

(52) U.S. Cl.
CPC .......... *A01K 1/0272* (2013.01); *A01K 1/0035* (2013.01); *A01K 1/0353* (2013.01); *B60N 2/36* (2013.01); *B60R 7/02* (2013.01); *B60R 7/043* (2013.01)

(58) Field of Classification Search
CPC ...... A47D 13/065; A47D 13/061; A01K 1/03; A01K 1/033; A01K 31/082; B65D 7/26
USPC ............. 224/275, 42.34, 549, 432, 497, 314
See application file for complete search history.

(56) References Cited

U.S. PATENT DOCUMENTS

| | | | | |
|---|---|---|---|---|
| 1,755,470 A | * | 4/1930 | Cooper | B65D 7/26 220/6 |
| 2,499,103 A | * | 2/1950 | Love | A01K 1/0272 119/28.5 |
| 2,501,359 A | * | 3/1950 | Stilson | A47D 13/065 217/4 |
| 3,410,328 A | * | 11/1968 | Sasai | B65D 7/26 108/145 |

(Continued)

FOREIGN PATENT DOCUMENTS

| | | |
|---|---|---|
| DE | 4417869 A1 | 11/1995 |
| DE | 102005029697 A1 | 12/2006 |
| KR | 101022992 B1 | 3/2011 |

OTHER PUBLICATIONS

English machine translation for DE102005029697.
English machine translation for KR101022992.
English machine translation for DE4417869.

*Primary Examiner* — Adam Waggenspack
(74) *Attorney, Agent, or Firm* — Vichit Chea; King & Schickli, PLLC (57) ABSTRACT

A deployable pet carrier assembly for a vehicle includes a sliding rail guide system configured to attach the pet carrier to a vehicle seat back and collapsible front, rear, and side walls defining a box structure when deployed. An actuator is provided, configured to retain or release the pet carrier walls for transitioning the pet carrier between a collapsed configuration and a deployed configuration. The sliding guide rail system includes front and rear guide rails configured to slidingly hold the pet carrier front wall and rear wall. A tray may be included to define a floor of the pet carrier.

6 Claims, 7 Drawing Sheets

(56) References Cited

U.S. PATENT DOCUMENTS

| | | | |
|---|---|---|---|
| 4,512,286 A * | 4/1985 | Rux | A01K 1/0272 |
| | | | 119/771 |
| 5,005,526 A * | 4/1991 | Parker | A01K 1/0272 |
| | | | 119/751 |
| 5,716,091 A * | 2/1998 | Wieczorek | B60R 7/02 |
| | | | 224/275 |
| 6,135,332 A | 10/2000 | Eleam | |
| 6,966,275 B2 * | 11/2005 | Whitehill | A01K 1/0353 |
| | | | 119/28.5 |
| 7,300,088 B1 | 11/2007 | Catenacci et al. | |
| 8,657,356 B2 | 2/2014 | Pywell et al. | |
| 2002/0112674 A1 * | 8/2002 | Lerner | A01K 1/0245 |
| | | | 119/497 |
| 2013/0248531 A1 * | 9/2013 | Lane | A45C 11/20 |
| | | | 220/262 |

* cited by examiner

FIG. 7

PET TRANSPORT

TECHNICAL FIELD

This disclosure relates generally to pet carriers. More particularly, the disclosure relates to a deployable pet carrier for a motor vehicle, the carrier being conveniently disposed within the vehicle for easy access and use.

BACKGROUND

Persons often must travel in their motor vehicles with their pets, for example for veterinary appointments, when moving, or even simply for companionship. However, an unrestrained animal in a vehicle presents a driver distraction and so potentially a hazard. Additionally, in the event of even a minor collision, an unrestrained animal is subject to severe injury. Still more, even a small unrestrained pet subjected to deceleration forces in a collision becomes a dangerous projectile that can injure the vehicle occupants.

For these and other reasons, various means of restraining animals in a vehicle have been developed. It is known, for example, to restrain animals by attaching a leash or other tether at one end to a collar or harness worn by the animal and at the other end to a portion of the vehicle such as a seatbelt harness, door handle, etc. This type of restraint likewise risks injury to the animal during a collision, since the animal will travel at least a short distance before reaching the end of the leash, exacerbating the deceleration force of the collision. Also, a leashed pet may be less likely to exercise restraint in relieving itself in the vehicle at need.

It is likewise known to use pet carriers to transport an animal in a vehicle. These are typically simply conventional carriers or crates as would be used in a home, placed loose in the vehicle and into which the animal is placed prior to operating the vehicle. However, such loose crates likewise become projectiles during a collision, risking injury to vehicle occupants. Conventional crates or pet carriers, while effective in restraining an animal, are also inconvenient in that they occupy significant space in a vehicle even if no pet is present.

To solve this and other problems, the present disclosure relates at a high level to a deployable pet carrier. Advantageously, the described deployable pet carrier is configured for securing to a motor vehicle seat back, includes collapsible side walls for pet security, and further includes a convenient deploying mechanism.

SUMMARY

In accordance with the purposes and benefits described herein, in one aspect a deployable pet carrier assembly for a vehicle is described. The carrier assembly includes a sliding rail guide system configured to attach the pet carrier to a vehicle seat back and collapsible front, rear, and side walls defining a carrier structure when deployed. The sliding guide rail system includes front and rear guide rails configured to slidingly hold the pet carrier front wall and rear wall. An actuator is provided, configured to retain or release the pet carrier walls for transitioning the pet carrier between a collapsed configuration and a deployed configuration.

In embodiments, each of the pet carrier front wall and rear wall is defined by a plurality of intersecting rails configured to provide a collapsible grid. Likewise, in embodiments each of the pet carrier side walls is defined by a plurality of interconnected panels configured to provide a collapsible panel. A tray is provided to define a floor for the carrier.

In the following description, there are shown and described embodiments of the disclosed deployable pet carrier. As it should be realized, the carrier is capable of other, different embodiments and its several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed deployable pet carrier, and together with the description serve to explain certain principles thereof. In the drawing.

Reference will now be made in detail to embodiments of the disclosed deployable pet carrier, examples of which are illustrated in the accompanying drawing figures.

DETAILED DESCRIPTION

Figure 1:
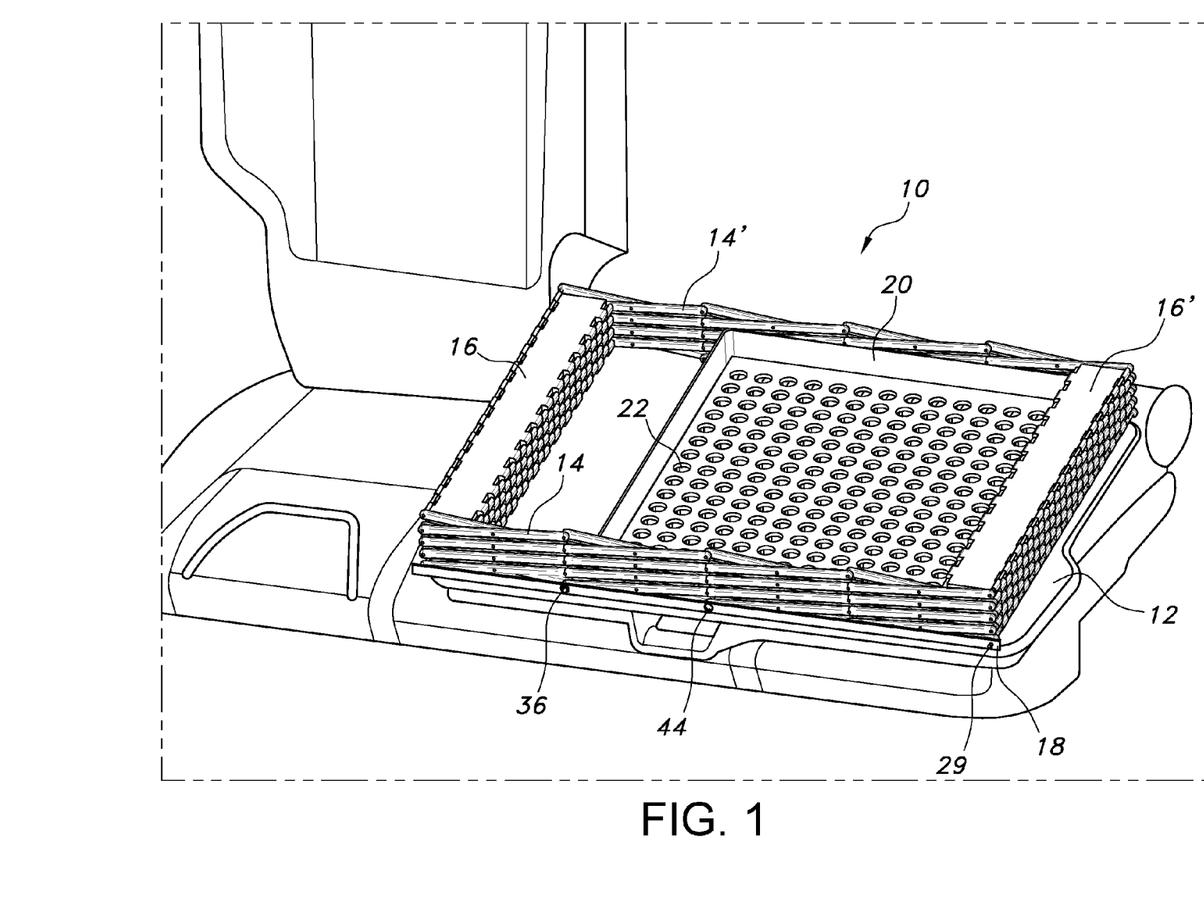
FIG. 1 depicts a deployable pet carrier according to the present disclosure.

Turning to FIG. 1, a collapsible pet carrier assembly 10 is depicted, configured for attaching to a vehicle seat back 12. Broadly, the pet carrier assembly 10 includes collapsible front and rear walls 14, 14' and collapsible side walls 16, 16'. Front and rear (not visible in this view) guide rails 18, 18' slidingly hold at least the front and rear walls 14, 14' and secure the pet carrier assembly 10 to the vehicle seat back 12. In one embodiment, at least one edge of front and rear walls 14, 14' is pivotally attached to a corresponding end of guide rails 18, 18' (see arrow).

A tray 20 is provided which serves as a floor for the pet carrier 10, optionally including a separate or integral perforated mat 22. As will be appreciated, the mat 22 provides a surface for a pet (not shown) having greater grip, and further allows drainage of liquid onto tray 20 in the event the pet relieves itself. Conveniently, tray 20 and mat 22 are removable for ease of cleaning and replacement at need. Molded studs or other fasteners (not visible in this view) prevent inadvertent dislodgment of the tray 20/mat 22 when the pet carrier assembly 10 is held in a stored configuration as discussed below.

Figure 2:
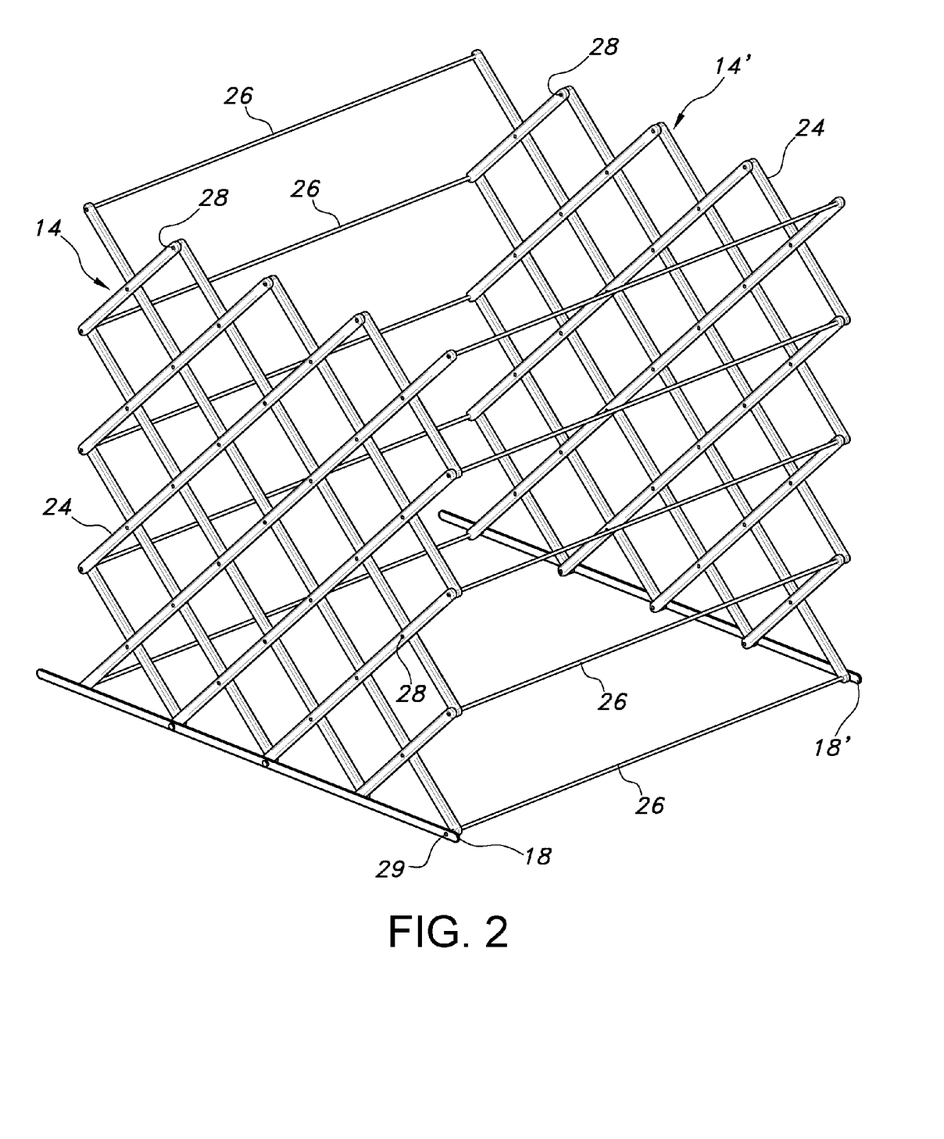
FIG. 2 depicts deployed front and rear walls of the carrier of FIG. 1.

In an embodiment (see FIG. 2), the front and rear walls 14, 14' are defined by a plurality of intersecting rails 24, pivotally interconnected one to another to define a collapsible grid structure. A plurality of first rods 26 pivotally connect the edges of front wall 14 to the corresponding edges of rear wall 14', similar in design to a collapsible laundry rack as is known in the art. Intersecting rails 24 may be pivotally interconnected by any suitable structure, such as by pins 28 as shown. In turn, for each of front and rear walls 14, 14', a lowermost end an intersecting rail 24 is pivotally connected to a corresponding end of front and rear guide rails 18, 18', such as by a pin 29 or in an alternative embodiment (not shown) by passing an end of a bottommost first rod 26 through an aperture in an end of each of front and rear guide rails 18, 18'. As will be appreciated, this feature of a plurality of intersecting rails 24 pivotally interconnected one to another to define collapsible front and rear walls 14, 14' allows altering a width dimension of front and rear walls 14, 14' during deployment and collapsing of the pet carrier assembly 10 as will be discussed.

Figure 3:
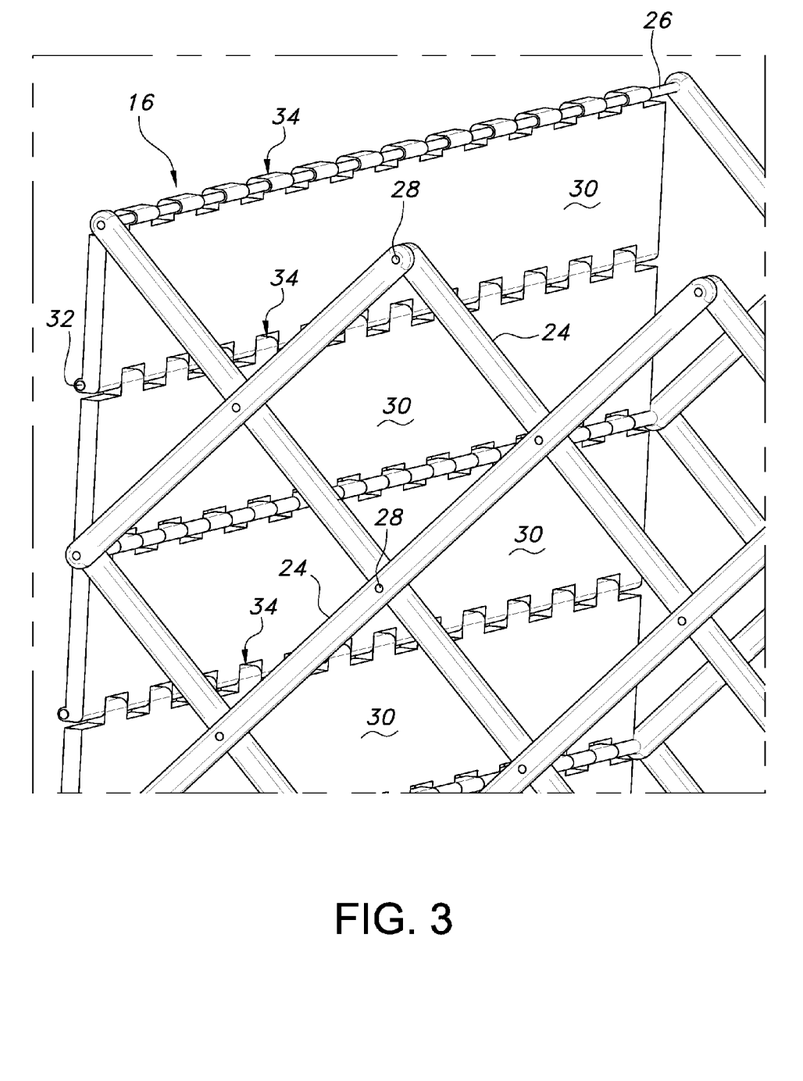
FIG. 3 depicts a deployed folding wall of the carrier of FIG. 1.

An embodiment of side walls 16, 16' is shown in FIG. 3. As shown therein, each of side walls 16, 16' is defined by a plurality of interconnected panels 30. Each panel 30 is configured to pivotally accept a first rod 26 through a first edge thereof. In turn, each panel 30 is likewise configured to pivotally accept a second rod 32 through a second, opposed edge thereof, thus interconnecting the plurality of panels 30 to define a collapsible panel side wall that is substantially solid when the pet carrier 10 is in the deployed configuration. In the depicted embodiment, hinge structures 34 are defined in the first and second edges of the panels 30 to allow interconnection thereof as described. As will be appreciated, this feature of interconnected panels 30 to define collapsible side walls 16, 16' preserves a width dimension of side walls 16, 16' during deployment and collapsing of the pet carrier assembly 10 as will be discussed.

Figures 4A, 4B:
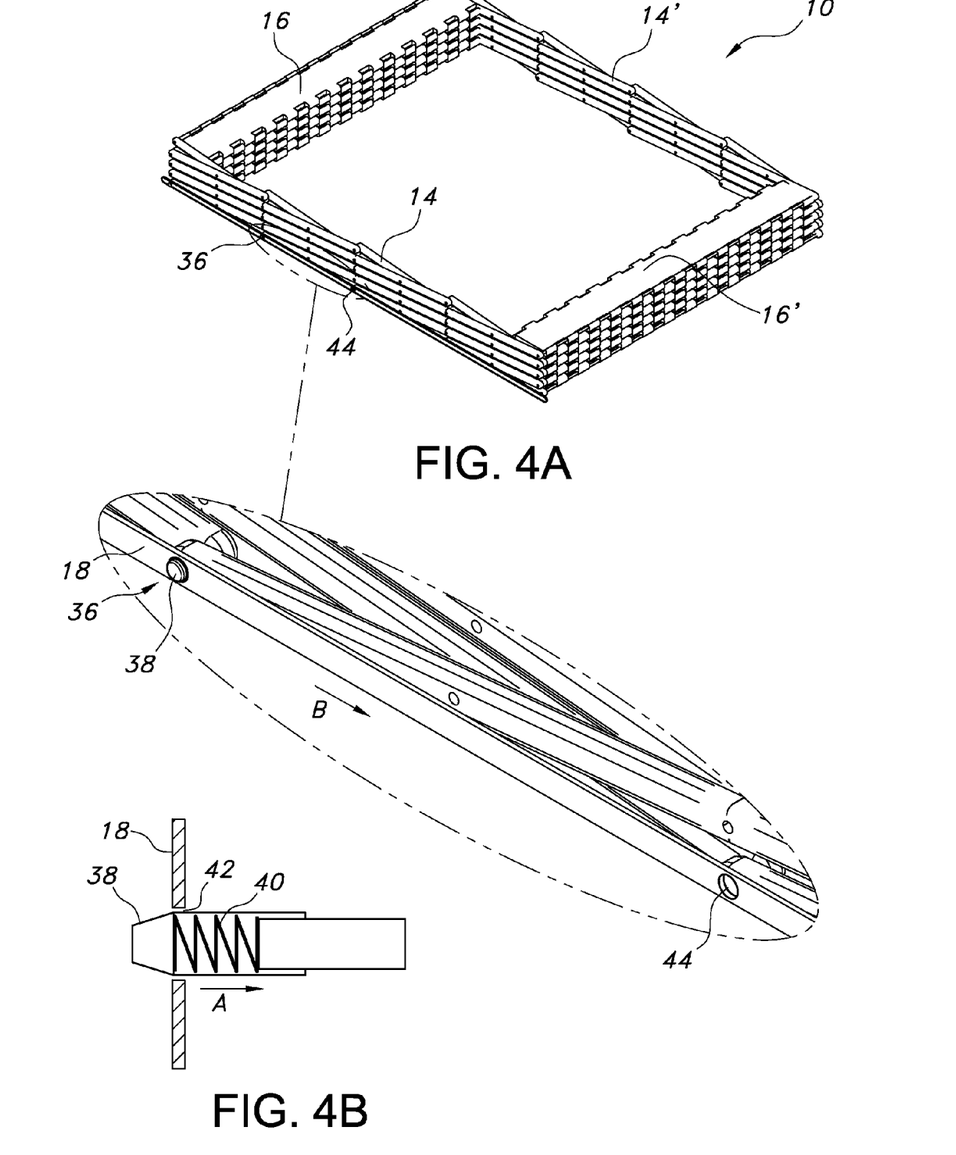
FIG. 4A depicts the carrier of FIG. 1 in the stored configuration, including an actuator embodiment for deploying the carrier.
FIG. 4B shows the actuator embodiment of FIG. 4A in isolation.

With reference to FIGS. 4A and 4B, the pet carrier assembly 10 further includes an actuator 36 for retaining the carrier in either the collapsed or the deployed configuration. In one embodiment, the actuator 36 is simply a pushbutton release 38, including a spring 40 for biasing pushbutton 38 outwardly through a first bore 42 defined in front rail 18. In this configuration, the pet carrier 10 is in the collapsed configuration shown in FIG. 4A. To deploy the carrier, a user need only urge the pushbutton 38 rearwardly against spring 40 (see arrow A) to clear bore 42, and may then raise front/rear walls 14, 14' and side walls 16, 16' upwardly to a deployed configuration.

As the carrier is deployed, the "footprint" defined by front/rear walls 14, 14' and side walls 16, 16' decreases slightly, and pushbutton 38 translates laterally (see arrow B). As the carrier reaches the fully deployed configuration (see FIG. 7), pushbutton 38 reaches and engages a second bore 44, thus maintaining deployed configuration until a user wishes to collapse the structure. Of course, the process of collapsing the carrier is simply the inverse of the process of deploying as described above.

Figure 5:
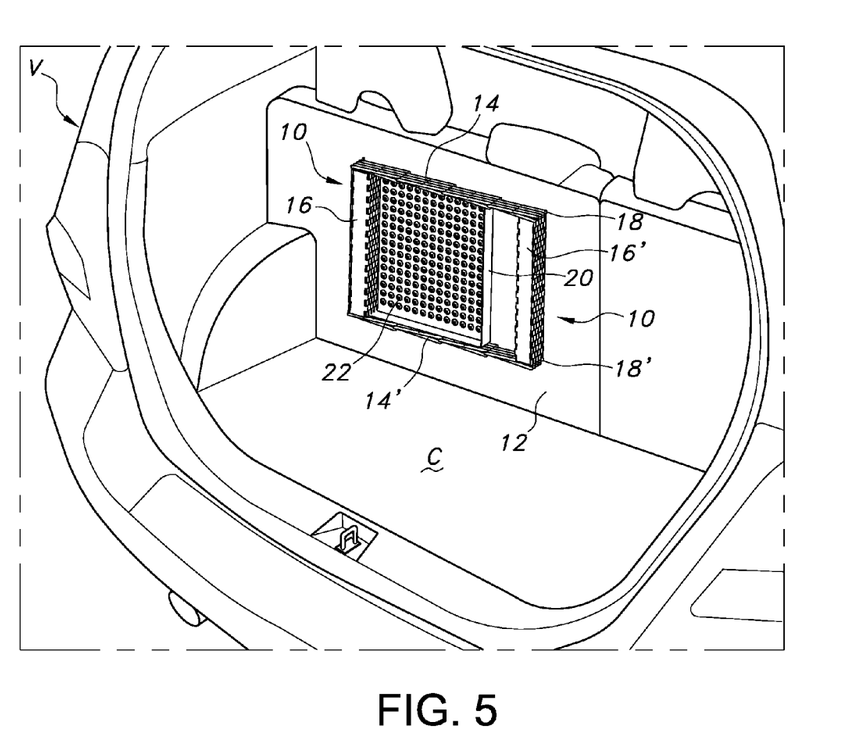
FIG. 5 depicts the carrier of FIG. 1 in the stored configuration, attached to an upright seat back of a second row seat of a motor vehicle.
Figure 6:
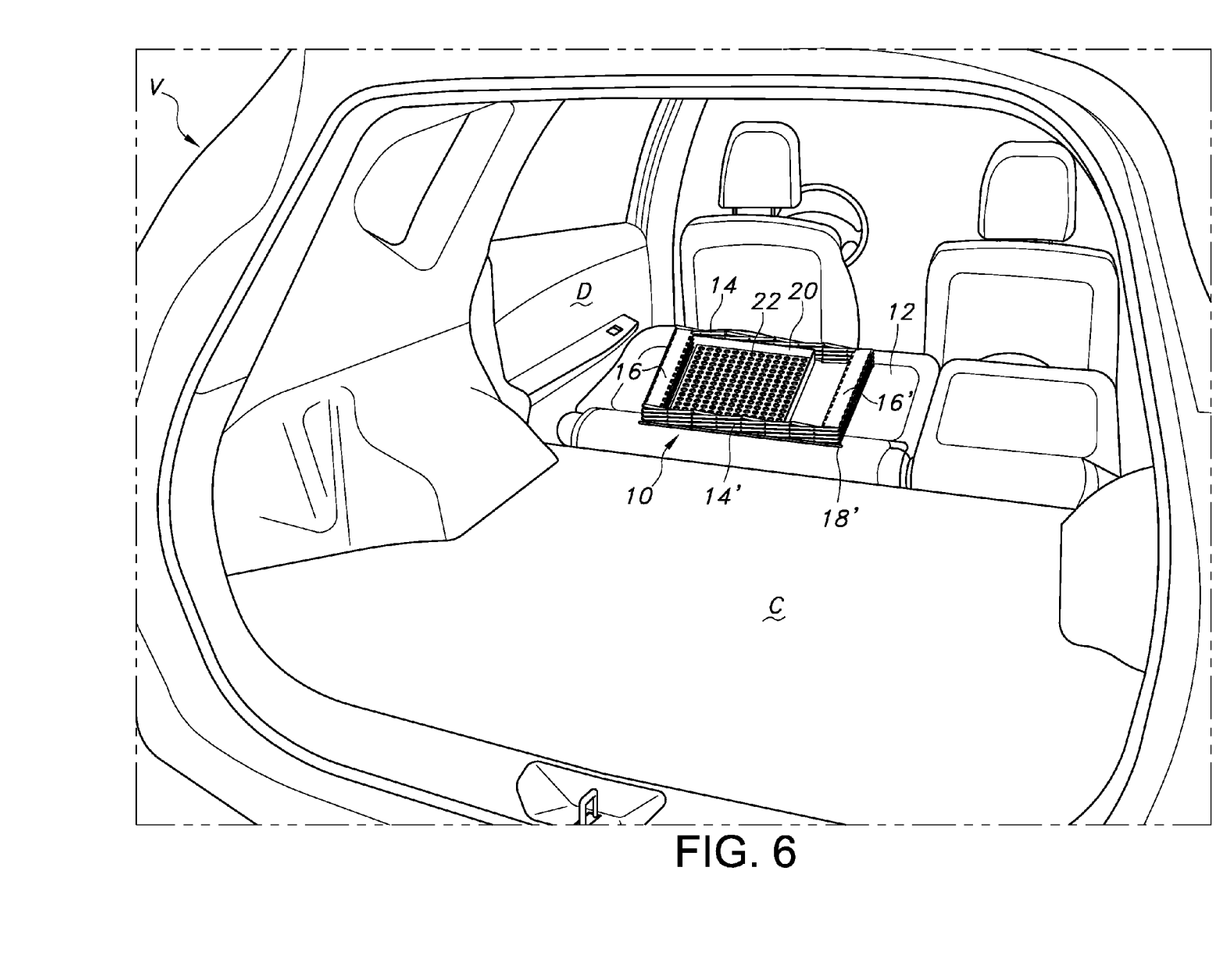
FIG. 6 shows the carrier of FIG. 5 with the second row seat back folded forward.
Figure 7:
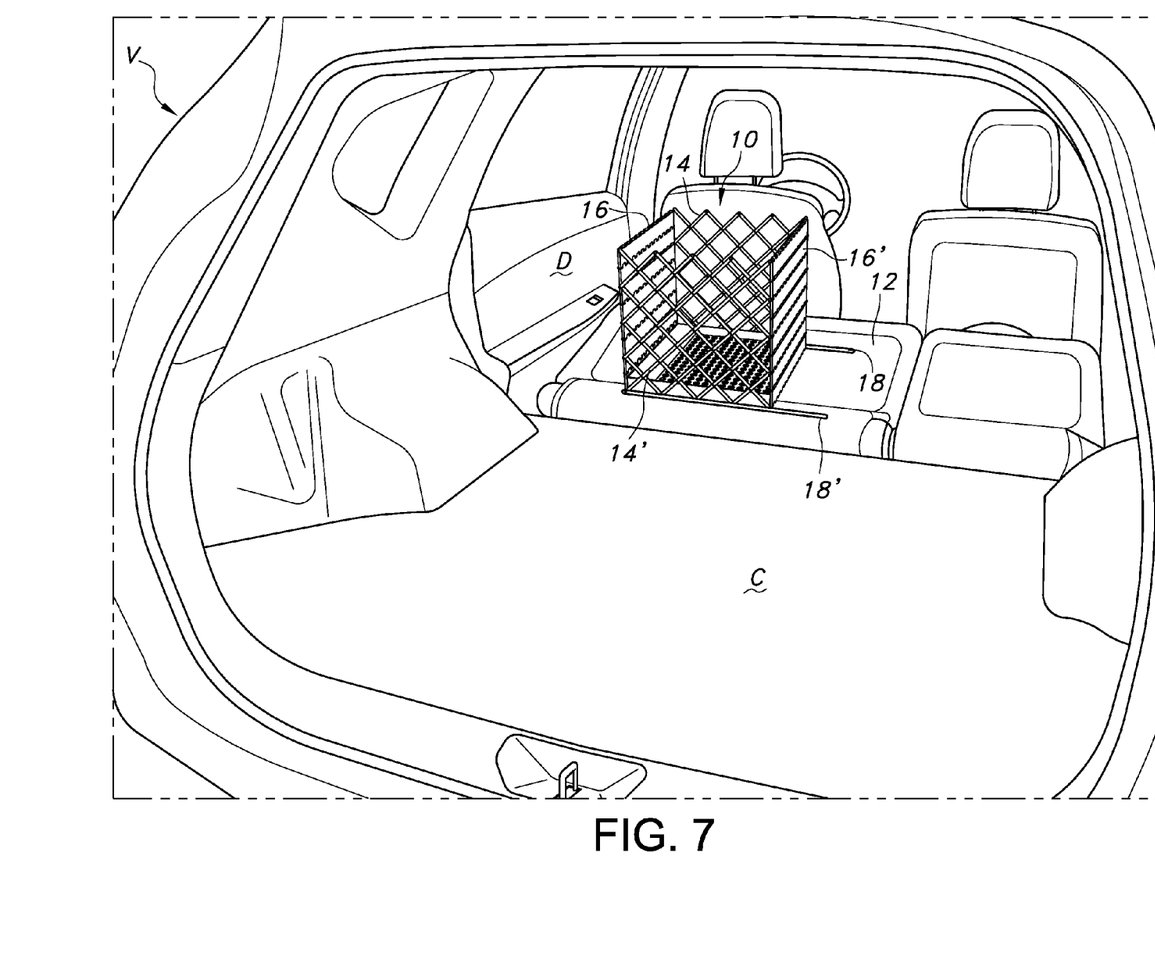
FIG. 7 depicts the carrier of FIG. 6 in the deployed configuration.

Turning now to FIGS. 5-7, conveniently the pet carrier assembly 10 is secured in the collapsed configuration to an upright vehicle V seatback 12 by guide rails 18, 18' (see FIG. 5). As shown, front wall 14 is disposed above rear wall 14'. In this configuration, actuator 36 is conveniently accessible to a user by way of passenger door D (not shown in this view, but see FIG. 6) when seatback 12 is folded forward. However, although the inverse relationship is also contemplated (rear wall 14' disposed above front wall 14). Thus, the pet carrier assembly 10 is conveniently available for use at a moment's notice, but does not occupy a significant portion of the available storage space of, for example, the vehicle cargo area C.

To use the pet carrier assembly 10, at least the portion of vehicle seat back 12 to which the carrier is secured is folded forward (see FIG. 6). Next, the pet carrier is deployed as described above, by operation of actuator 36, and the carrier is translated to the deployed configuration (FIG. 7). During this translation, as the front/rear walls 14, 14' and side walls 16, 16' are raised, the carrier footprint decreases slightly as described above, i.e. front/rear walls 14, 14' lessen in width and side wall 16' translates towards side wall 16 without altering a width dimension thereof (note the greater portion of guide rails 18, 18' visible in the deployed configuration compared to the collapsed configuration of FIG. 6). Then, actuator 36 engages second bore 44 (not visible in this view) to retain the carrier in the deployed configuration.

Typically, a pet is placed on tray 20/mat 22 before deploying the pet carrier assembly 10 as described above. This is because after deployment the vehicle roof/headliner is typically sufficiently near a top edge of front/rear walls 14, 14' and side walls 16, 16' that the vehicle roof/headliner serves as a de facto lid or top for the pet carrier assembly 10. However, it will be appreciated that alternative configurations are possible, for example providing a separate lid or top (not shown) for a pet carrier assembly 10 having shorter walls or when using the pet carrier assembly in a vehicle having a higher roof/headliner to prevent the pet from inadvertently exiting the carrier.

Thus, it will be appreciated that a simple, effective vehicle-mounted pet carrier is provided, which is stored in a vehicle without significant negative impact on available storage space in the vehicle. The carrier is easily deployed for use as needed, and equally easily collapsed for storage when not needed. Obvious modifications and variations are possible in light of the above teachings. All such modifications and variations are within the scope of the appended claims when interpreted in accordance with the breadth to which they are fairly, legally and equitably entitled.

What is claimed:

1. A deployable pet carrier assembly for a vehicle, comprising:
   a guide rail system configured to attach the pet carrier to a vehicle seat back;
   front and rear walls comprising a plurality of rails pivotally coupled together to form a collapsible grid;
   side walls comprising a plurality of panels hingedly connected to allow for expansion and collapse of the side walls; and
   a spring-biased actuator configured to retain or release all of the pet carrier walls for transitioning the pet carrier between a collapsed configuration and a deployed configuration wherein the front and rear walls are pivotally connected to the side walls whereby expanding or collapsing one of the front and rear walls or the side walls will also expand or collapse the remaining front and rear walls or side walls.

2. The assembly of claim 1, wherein the spring-biased actuator is a pushbutton release.

3. The assembly of claim 1, further including a tray defining a floor of the pet carrier.

4. The assembly of claim 1, further including a perforated cushioning mat disposed within the tray.

5. The assembly of claim 1, wherein the guide rail system includes front and rear guide rails.

6. A vehicle including the assembly of claim 1.

* * * * *